(12) United States Patent
Yang

(10) Patent No.: US 6,617,543 B1
(45) Date of Patent: Sep. 9, 2003

(54) METHOD OF MAKING PATTERN FOR DECORATIVE PIECE

(76) Inventor: Shih-Sheng Yang, PO Box 82-144, Taipei (TW)

( * ) Notice: Subject to any disclaimer, the term of this patent is extended or adjusted under 35 U.S.C. 154(b) by 0 days.

(21) Appl. No.: 10/179,185

(22) Filed: Jun. 26, 2002

(30) Foreign Application Priority Data

Apr. 11, 2002 (TW) .......................... 91107270 A

(51) Int. Cl.⁷ .............................................. B23K 26/38
(52) U.S. Cl. ............................................... 219/121.69
(58) Field of Search ...................... 219/121.67, 121.68, 219/121.69, 121.7, 121.71, 121.72, 121.82, 121.83, 121.84, 121.85

(56) References Cited

U.S. PATENT DOCUMENTS

| | | | | |
|---|---|---|---|---|
| 3,715,734 A | * | 2/1973 | Fajans | 365/127 |
| 4,843,207 A | * | 6/1989 | Urbanek et al. | 219/121.6 |
| 5,206,496 A | * | 4/1993 | Clement et al. | 250/271 |
| 5,268,862 A | * | 12/1993 | Rentzepis | 365/151 |
| 5,575,936 A | * | 11/1996 | Goldfarb | 219/121.68 |
| 5,637,244 A | * | 6/1997 | Erokhin | 219/121.69 |
| 5,653,900 A | * | 8/1997 | Clement et al. | 219/121.68 |
| 5,656,186 A | * | 8/1997 | Mourou et al. | 219/121.69 |
| 5,786,560 A | * | 7/1998 | Tatah et al. | 219/121.77 |
| 5,886,318 A | * | 3/1999 | Vasiliev et al. | 219/121.69 |
| 6,087,617 A | * | 7/2000 | Troitski et al. | 219/121.6 |
| 6,231,196 B1 | * | 5/2001 | Mahachek | 359/838 |
| 6,322,958 B1 | * | 11/2001 | Hayashi | 219/121.68 |
| 6,333,485 B1 | * | 12/2001 | Haight et al. | 219/121.68 |
| 6,333,486 B1 | * | 12/2001 | Troitski | 219/121.69 |
| 6,392,683 B1 | * | 5/2002 | Hayashi | 347/224 |
| 6,399,914 B1 | * | 6/2002 | Troitski | 219/121.69 |
| 6,417,485 B1 | * | 7/2002 | Troitski | 219/121.69 |
| 6,423,162 B1 | * | 7/2002 | Schwartz et al. | 148/512 |
| 6,426,480 B1 | * | 7/2002 | Troitski | 219/121.68 |
| 6,490,299 B1 | * | 12/2002 | Raevsky et al. | 372/10 |

FOREIGN PATENT DOCUMENTS

| | | | |
|---|---|---|---|
| DE | 237972 | * | 8/1986 |
| RU | SU 321422 | * | 1/1972 |
| RU | WO 96/30219 | * | 3/1996 |

OTHER PUBLICATIONS

Troitski, "Systems for creation of laser–induced images and problems of their optimization." Laser–Induced Damage in Optical Materials. 1999. pp. 489–499.*
Troski, "Experience of creation of laser–induced damage images." Laser–Induced Damage in Optical Materials.1999. pp. 479–488..*
Efimov et al. "Photoinization of silicate glasses to IR femtosecodn pulses." Journal of Non–Crystalline Solids. v 253. 1999. pp 58–67.*
Troitski, "Image Recording by Laser–induced damages." Optical Memory and Neural Networks. pp. 233–238. vol. 9, No. 4. 200.*
Skuja et al. "Laser–induced color centers in silica." Laser–Induced Damage in Optical Materials. 2000. pp 155–163.*

* cited by examiner

*Primary Examiner*—Tom Dunn
*Assistant Examiner*—Jonathan Johnson
(74) *Attorney, Agent, or Firm*—Leong C. Lei

(57) ABSTRACT

A method of making patterns for decorative piece, comprising the steps of using a metal plate as the molding substrate for laser etching; placing the mold substrate under a laser etching device, and cutting the substrate into a recession of appropriate depth. Further, the height of the laser head of the laser etching device is lifted, and then the dispersion of laser beam can be accomplished by means of a reflective lens. In the meantime, the depth of etching is reduced progressively, and the etching area is expanded along the path of previously cut recession. The manufacturing is made by progressively lifting the laser emitting head according to the theory described above.

4 Claims, 7 Drawing Sheets

METHOD OF MAKING PATTERN FOR DECORATIVE PIECE

BACKGROUND OF THE INVENTION (a) Field of the Invention

The present invention relates to a method of making patterns for decorative piece.

(b) Description of the Prior Art

The conventional decorative piece of a zipper generally adopts the plastic injection method to manufacture all kinds of integral patterns and styles, or pressing thin metallic plates to produce the desired patterns and lines. However, the decorative piece of the zipper regardless of its formation by plastic injection of non-metallic materials or by pressing thin metallic plates has patterns or lines with larger size, and even worse its precision cannot be improved. Furthermore, the texture of the material is hard and cold which gives a feeling of strangeness and lacks the soft warm touch. As disclosed in R.O.C. Patent (Application No. 87113232) entitled "Method of making multi-color decorative piece for zipper head", it shows a method of making a decorative piece fro zipper by plastic injection method. Such method forms patterns by traditional plastic injection molding, and thus the patterns so formed have the limitation of fineness and are unable to meet the fineness requirement for the size of only 0.03~0.07 mm. Therefore, general steel mold is not able to produce patterns of such fineness.

Therefore, it is an object of the present invention to provide a method of making patterns for decorative piece which can obviate and mitigate the above-mentioned drawbacks.

SUMMARY OF THE INVENTION

The primary objective of the present invention is to provide a method of making pattern for a decorative piece, using metallic plate as the substrate, etching by laser etching to form a small conical recession, and manufacturing by plastic injection to produce small pins on the plastic material which is elastic in nature so that it gives a soft touch feeling and friction when it is touched or squeezed.

The secondary objective of the present invention is to provide a method of making patterns for a decorative piece, and the small conical pins so formed having the smallest diameter of only 0.07 mm.

Another objective of the present invention is to provide a method of making patterns for decorative piece, and the decorative piece so formed having a plurality of small conical pins, gives a soft warm touch when it goes with the pulling plate of the zipper, and prevents slippery when force is applied. It thus enhances the visual feeling.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1B:
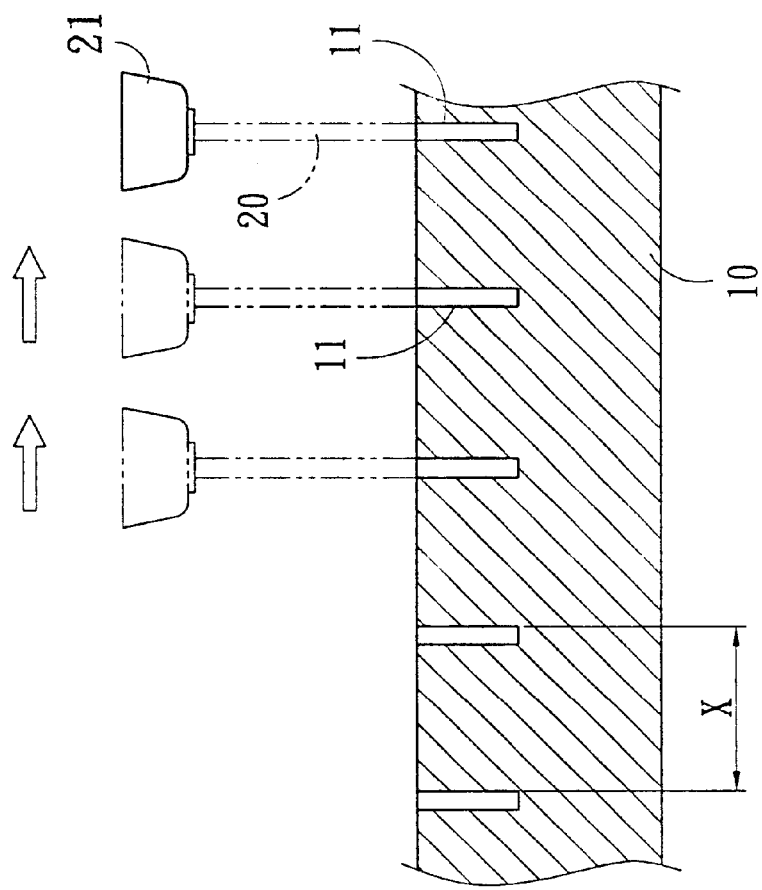
FIGS. 1a~1d are the schematic diagrams of the manufacturing procedure according to the present invention.
Figure 1A:
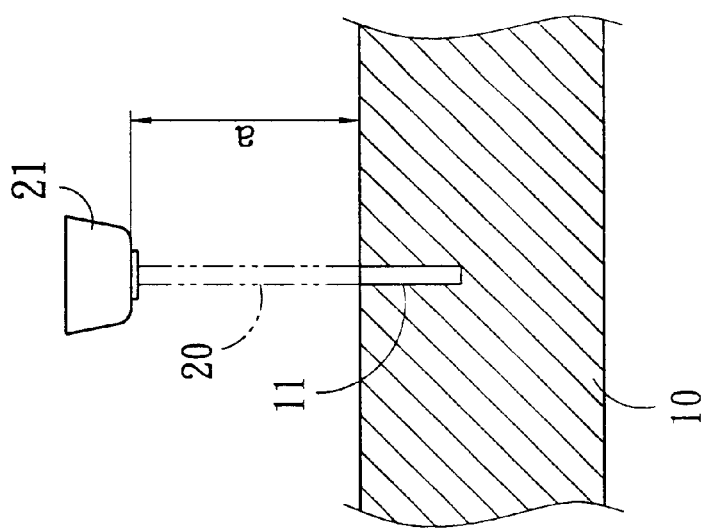
Figure 1D:
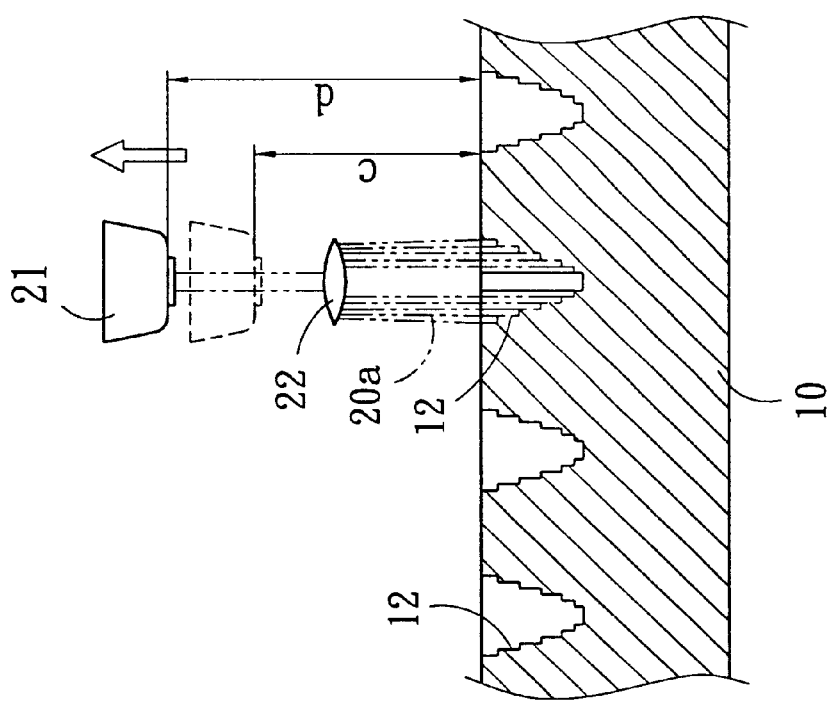
Figure 1C:
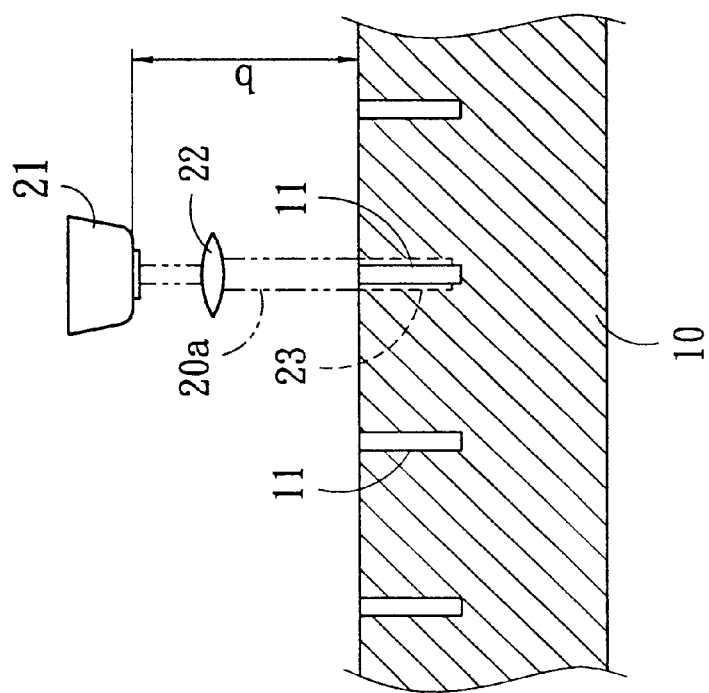
Figure 2:
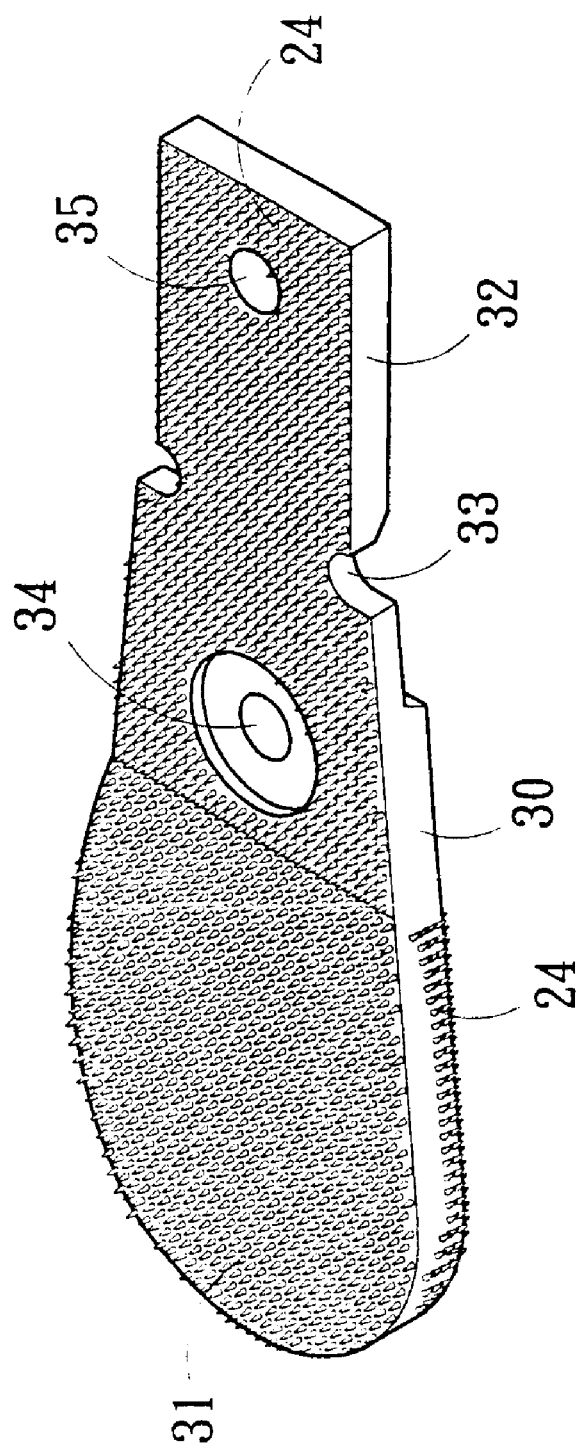
FIG. 2 is a diagram showing the external appearance of the present invention.
Figure 3:
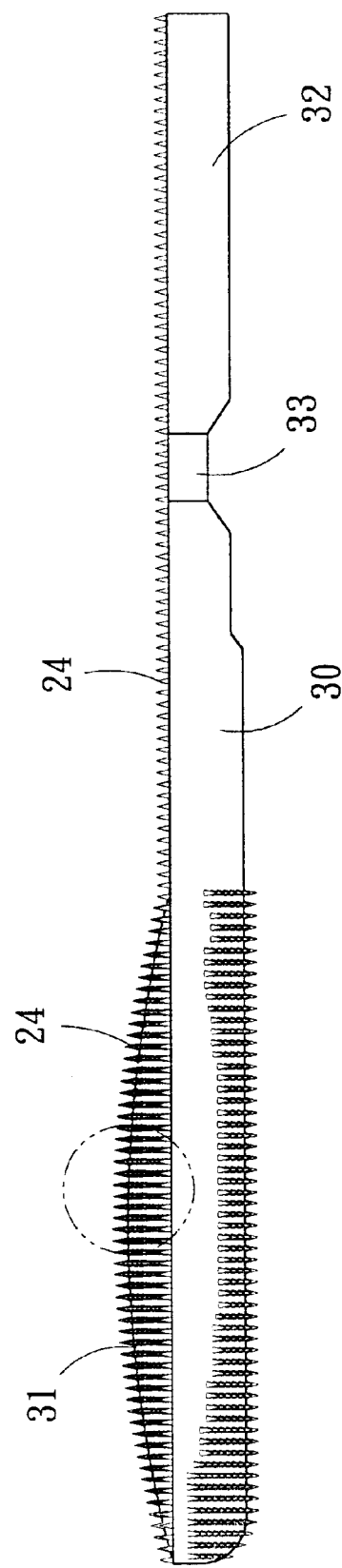
FIG. 3 is a side view diagram of the present invention.
Figure 4:
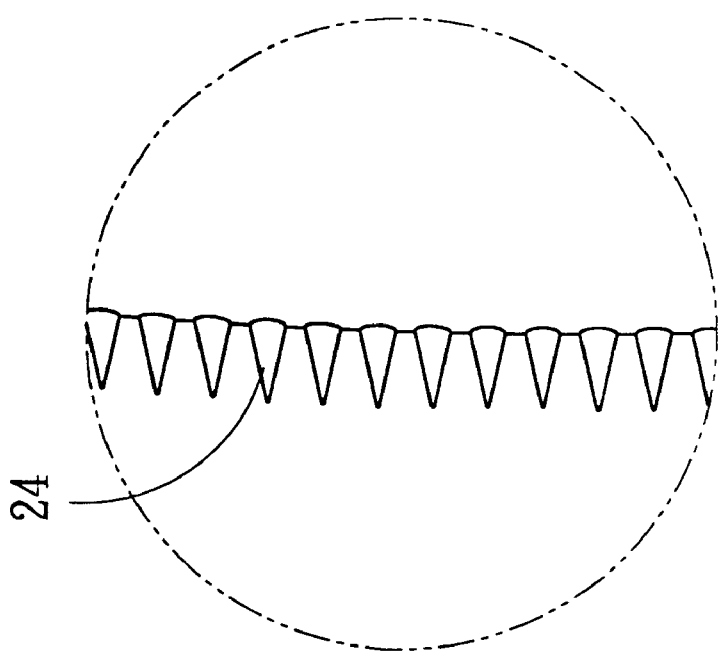
FIG. 4 is a schematic diagram enlarging a section of the present invention.
Figure 5:
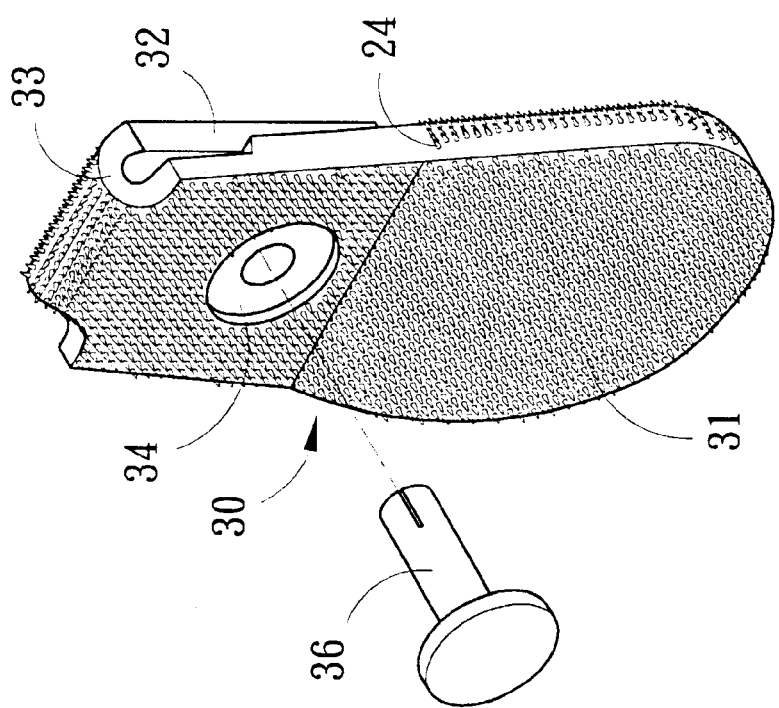
FIG. 5 is a schematic diagram showing the coupling by a rivet according to the present invention.
Figure 6:
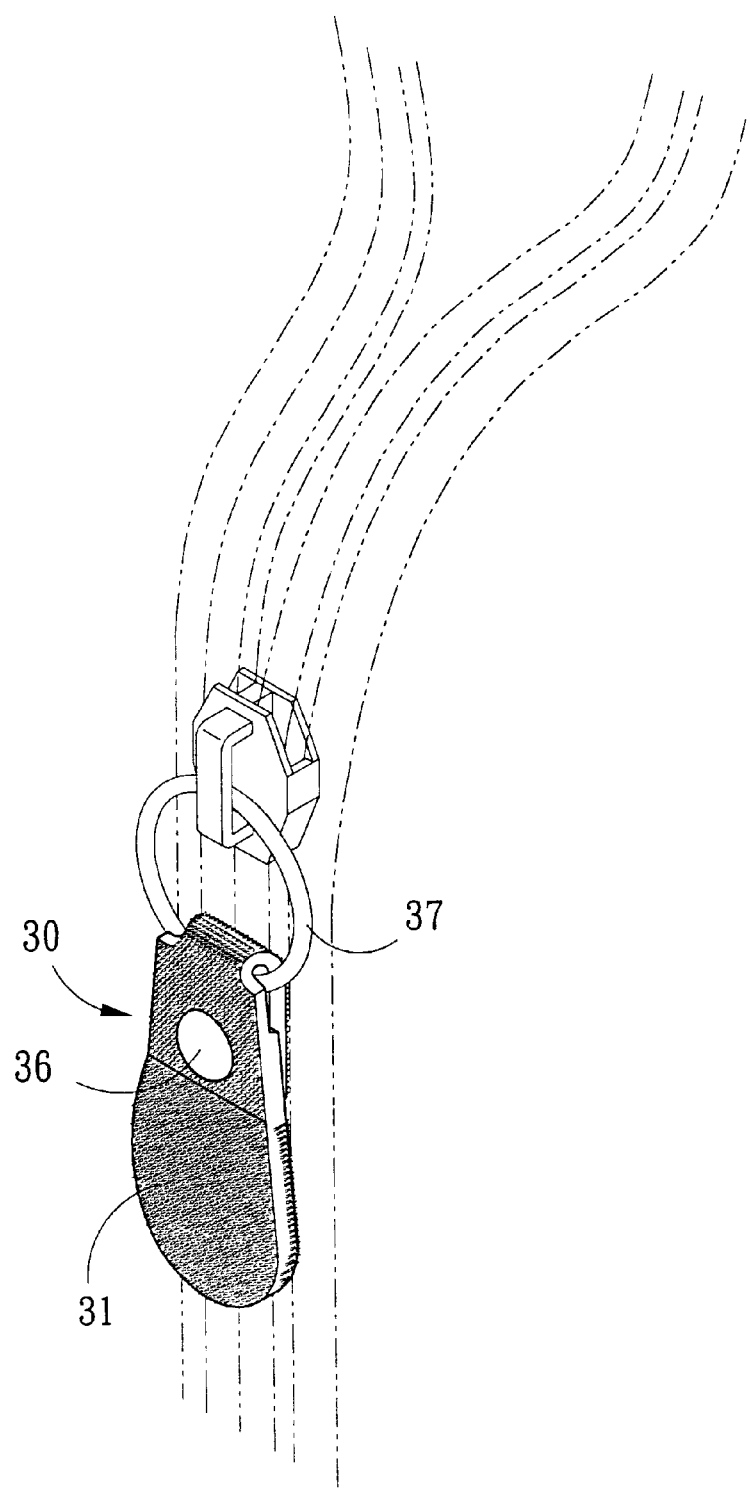
FIG. 6 is an illustrative diagram showing the coupling of the present invention with a zipper head.

Please refer to FIGS. 1a~1d for a preferred embodiment of the present invention, which carves a substrate 10 of a mold by a laser beam 20, and such laser beam 20 is shifted with an increment of x to cut an evenly distributed recession 11 with a specific depth on the a surface first, and then progressively lifts the laser head 2 to a specific height in order to enlarge the diameter of the emitting area of the laser beam 20 by means of the reflection from a convex lens. At that time, the depth cut by the laser beam 20a is shallower than that produced by the laser beam 20. Same procedure is repeated to etch at the same position with progressively shallower layer 23. The laser head 20 is constantly lifted progressively and the depth of the emitting depth becomes shallower and the emitting area gets larger progressively to carve a small conical recession 12. After the small conical recession 12 with the precision of only 0.03~0.07 mm is manufactured and formed by plastic injection of plastic material, small pins 24 (as shown in FIGS. 2~4) are formed by formation of plastic material, and thus gives a soft touch feeling and friction when it is squeezed or touched.

Therefore, method of making patterns for a decorative piece according to the present invention uses metallic plate for the substrate, and the following manufacture procedure is applied:

a. Putting the metallic plate mold material under the laser etching device;

b. Etching by the laser beam with the diameter of about 0.03 mm to produce a cut recession with an appropriate depth of about 0.5 mm;

c. Shifting the emitting position of the laser beam incrementally to form an evenly distributed recession on a surface;

d. Following the laser emitting position of the previous stage for etching the cut recession, and when the laser head is lifted to a specific height, the diameter of the laser beam becomes larger than the original laser beam diameter of 0.03 mm and at the same time, progressively lowers the depth to less than 0.5 mm by means of the reflection of a convex lens;

e. Repeating to lift the height of the laser head according to the previous theory, and shifting the emitting position of the laser beam incrementally to etch a small conical recession; and f. Performing the plastic injection manufacturing to produce small pins of plastic material, and each pin is elastic and gives a soft touch to the decorative piece when it is touched or squeezed.

The laser head is finally lifted to the height of about 0.5 mm according to the theory, and the laser beam expands the emitting area with the diameter of 0.35 mm via a convex lens. Therefore, it carves the small conical recess, and further forms the decorative piece having tiny pins on its surface, which gives a soft touch feeling and friction.

Please refer to FIGS. 2~4. A decorative piece 30 according to a preferred embodiment of the present invention having a small formation pattern comprises a holding section 31, a curved section 23, a thin plate section 33, a rivet 34, 35, and a plurality of tiny conical pins 24 being formed equidistant with equal height, and the tip of the pin is only of the size of 0.07 mm, and the bottom of the cone of the recession 12 is only 0.03 mm. However, the injected material cannot be injected all the way to the close conical base during the injection formation. Therefore it can only produce a pin tip with the size of about 0.07 mm, and the distribution of the pins are very dense. After the curved section 32 is folded into half by a rivet 35, it can be coupled to an pulling plate 37 of a zipper to facilitating the pulling of the zipper and enhance the touching feeling as well as the friction to prevent slippery.

In summation to the above description, the present invention produces fine conical pins to give a very soft touch and comfortable feeling and innovative artistic sense. Compared with the plastic injection manufacturing method for conventional decorative piece, the present invention adds value and distinctive texture to the whole, and also forms a decorative piece with trademark logos on it, which is particularly suitable for the promotion of products like garment, backpack, and shoes, etc.

The present invention complies with the patentabilty, and hence submitted to the Patent and Trademark Office for review and granting of the commensurate patent rights.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of making pattern for decorative piece, comprising the steps of: using a metallic plate as the substrate for a mold; etching the metallic plate with laser beam by incrementally moving the emitting position of the laser beam; cutting the metallic plate to form an even recession with a specific depth, and the laser head being progressively lifted to a specific distance to expand the emitting area by the increased diameter of laser beam, and in the meantime, the cut depth being decreased progressively; constantly lifting the position of the etching head and etching the same position on the metallic plate with a relatively shallower depth; and the etching with expanded area etching a conical recession on the substrate of the mold; and forming a plurality of small pins on a plastic material by plastic injection.

2. A method of making pattern for decorative piece as claimed in claim 1, wherein said laser beam having an emitting diameter of 0.03 mm for the first time laser etching.

3. A method of making pattern for decorative piece as claimed in claim 1, wherein said laser beam cutting the recession in the depth of approximately 0.5 mm for the first time laser etching.

4. A method of making pattern for decorative piece as claimed in claim 1, wherein said plastic material is elastic.

* * * * *